(12) United States Patent
Zait et al.

(10) Patent No.: US 6,957,225 B1
(45) Date of Patent: Oct. 18, 2005

(54) AUTOMATIC DISCOVERY AND USE OF COLUMN CORRELATIONS IN TABLES

(75) Inventors: Mohamed Zait, Sunnyvale, CA (US); Abhinav Gupta, Palo Alto, CA (US); Benoit Dageville, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 352 days.

(21) Appl. No.: 10/160,585

(22) Filed: May 30, 2002

Related U.S. Application Data (60) Provisional application No. 60/378,844, filed on May 7, 2002.

(51) Int. Cl.[7] .............................................. G06F 17/30
(52) U.S. Cl. ........................ 707/102; 707/2; 707/100
(58) Field of Search .............................. 707/2–5, 100, 707/101, 102

(56) References Cited

U.S. PATENT DOCUMENTS

| | | | | |
|---|---|---|---|---|
| 5,590,319 A | | 12/1996 | Cohen et al. | 707/4 |
| 5,734,893 A | | 3/1998 | Li et al. | 707/4 |
| 5,848,408 A | | 12/1998 | Jakobsson et al. | 707/3 |
| 5,864,842 A | * | 1/1999 | Pederson et al. | 707/3 |
| 6,092,062 A | | 7/2000 | Lohman et al. | 707/2 |
| 6,105,020 A | | 8/2000 | Lindsay et al. | 707/2 |
| 6,272,487 B1 | * | 8/2001 | Beavin et al. | 707/2 |
| 6,341,281 B1 | * | 1/2002 | MacNicol et al. | 707/3 |
| 6,662,175 B1 | * | 12/2003 | Ghazal et al. | 707/2 |

OTHER PUBLICATIONS

U.S. Appl. No. 09/795,904, filed Feb. 27, 2001, entitled "Method and Mechanism for Partition Pruning," Hakan Jakobsson et al., 47 pages.

* cited by examiner

*Primary Examiner*—Greta L. Robinson
*Assistant Examiner*—Cheryl Lewis
(74) *Attorney, Agent, or Firm*—Hickman Palermo Truong & Becker LLP; John D. Henkhaus (57) ABSTRACT

Methods are provided for automatically discovering correlations between values in columns of tables. A set of significantly correlated columns is identified by identifying correlated columns, and by determining the significance of the correlation between the correlated columns from one or more tables. If the correlated columns are considered significantly correlated, a correlation table is constructed that includes records representing distinct combinations of values corresponding to the correlated columns. Embodiments include methods for identifying correlated columns, for determining the significance of the correlation between the correlated columns, and for using the resultant correlation table to enhance performance of a query execution process. One particular embodiment provides for using a correlation table for partition pruning a partitioned table, with respect to a query execution plan.

42 Claims, 3 Drawing Sheets

AUTOMATIC DISCOVERY AND USE OF COLUMN CORRELATIONS IN TABLES

CROSS REFERENCE TO RELATED APPLICATION

This application claims the benefit of priority from commonly owned U.S. Provisional Patent Application No. 60/378,844, filed on May 7, 2002, entitled "Automatic Discovery and Use of Column Correlations in Tables", which is hereby incorporated by reference in its entirety, as if fully set forth herein, for all purposes.

FIELD OF THE INVENTION

The present invention relates generally to database management systems and, more specifically, to techniques for automatically discovering correlations between columns in tables.

BACKGROUND OF THE INVENTION

Database management systems (DBMS) retrieve information in response to receiving queries that specify the information to retrieve. In order for a database management system to understand the query, the query should conform to a database language recognized by the database management system, such as the Structured Query Language (SQL).

In an OLAP (on-line analytical processing) environment or a data warehousing environment, data is often organized into a star schema. A star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables".

Table Partitioning

In conventional relational database tables, rows are inserted into the table without regard to any type of ordering. Consequently, when a user submits a query that selects data from the table based on a particular value or range of values, the entire table has to be scanned to ensure that all rows that satisfy the criteria are identified. Partitioning is a technique that, in certain situations, avoids the need to search an entire table.

With partitioning, a database table is divided up into sub-tables, referred to as "partitions". The most common form of partitioning is referred to as range partitioning. With range partitioning, each individual partition corresponds to a particular range of values for one or more columns of the table. For example, one column of a table may store date values that fall within a particular year, and the table may be divided into twelve partitions, each of which corresponds to a month of that year. All rows that have a particular month in the date column would then be inserted into the partition that corresponds to that month. In this example, partitioning the table will increase the efficiency of processing queries that select rows based on the month contained in the date column. For example, if a particular query selected all rows where the month equals January, then only the partition associated with the month of January would have to be scanned.

Typically, the criteria used to partition a database table is specified in the statement that creates the database table. For example, the following Structured Query Language (SQL) statement creates a table "sales" that is range partitioned based on date values contained in a column named "saledate":

```
create table sales
(saledate DATE,
productid NUMBER, . . . )
partition by range (saledate)
    partition sal94Q1 values less than to_date (yy-mm-dd, '94-04-01')
    partition sal94Q2 values less than to_date (yy-mm-dd, '94-07-01')
    partition sal94Q3 values less than to_date (yy-mm-dd, '94-10-01')
    partition sal94Q4 values less than to_date (yy-mm-dd, '95-01-01')
```

Execution of this statement creates a table named "sales" that includes four partitions: sal94Q1, sal94Q2, sal94Q3, and sal94Q4. The partition named sal94Q1 includes all rows that have a date less than 94-04-01 in their saledate column. The partition named sal94Q2 includes all rows that have a date greater than or equal to 94-04-01 but less than 94-07-01 in their saledate column. The partition named sal94Q3 includes all rows that have a date greater than or equal to 94-07-01 but less than 94-10-01 in their saledate column. The partition named sal94Q4 includes all rows that have a date greater than or equal to 94-10-01 but less than 95-01-01 in their saledate column.

Another form of partitioning is referred to as hash partitioning. According to hash partitioning, one or more values from each record are applied to a hash function to produce a hash value. A separate partition is established for each possible hash value produced by the hash function, and rows that hash to a particular value are stored within the partition that is associated with that hash value. Similar to range based partitioning, hash partitioning increases the efficiency of processing certain types of queries. For example, when a query selects all rows that contain a particular value in the column that is used to perform the hash partitioning, the database server can apply the value in the query to the hash function to produce a hash value, and then limit the scan of the table to the partition that corresponds to the hash value thus produced.

A table that is hash partitioned into four partitions may be created by the following statement:

```
create table sales
    (saledate DATE,
        productid NUMBER, . . . )
    partition by hash (saledate)
    partitions 4.
```

Unlike range-based partitioning, partition pruning cannot be performed for statements with predicates that specify ranges of partitioning key values. Consequently, hash-based partitioning is often used when the nature of the partitioning key is such that range-based queries are unlikely, such as when the partitioning key is "social security number", "area code" or "zip code".

Partition Pruning

When a database server receives a request to perform an operation, the database server makes a plan of how to execute the query. If the operation involves accessing a partitioned table, part of making the plan involves determining which partitions of the partitioned table, if any, can be excluded from the plan (i.e. which partitions need not be accessed to execute the query). The process of excluding partitions from the execution plan of a query that accesses a partitioned table is referred to as "partition pruning".

Unfortunately, conventional pruning techniques can only be applied to a limited set of statements. For example, the database server can perform partition pruning when the statement received by the database server explicitly limits itself to a partition or set of partitions. Thus, the database server can exclude from the execution plan of the statement "select * from sales PARTITION(sal94Q1)" all partitions of the sales table other than the sal94Q1 partition.

The database server can also perform partition pruning on statements that do not explicitly limit themselves to particular partitions, but which select data based on the same criteria that was used to partition the partitioned table. For example, the statement:

select * from sales where saledate between (94-04-01) and (94-06-15)

does not explicitly limit itself to particular partitions. However, because the statement limits itself based on the same criteria (saledate values) as was used to partition the sales table, the database server is able to determine, based on the selection criteria of the statement and the partition definitions of the table, which partitions need not be accessed during execution of the statement. In the present example, the database server would be able to perform partition pruning that limits the execution plan of the statement to sal94Q2.

Similarly, database servers can perform partition pruning for queries with WHERE clauses that (1) specify equalities that involve the partitioning key (e.g., WHERE saledate=94-02-05), (2) include IN lists that specify partitioning key values (e.g., WHERE saledate IN (94-02-05, 94-03-06)), and (3) include IN subqueries that involve the partitioning key (e.g., WHERE salesdate IN (select datevalue from T)).

Under certain circumstances, partition pruning is still possible in situations where the query does not include a predicate (i.e., a condition) on the partitioning key (i.e., the column on which the partitioned table is partitioned). Specifically, U.S. Pat. No. 6,014,656, entitled "Using Overlapping Partitions Of Data For Query Optimization" describes a technique for performing partition pruning in situations where (1) the query does not include a predicate on the partitioning key, and (2) there is an explicitly defined correlation between the partitioning key and the column referenced in the predicate of the query.

One difference between the referenced patent and the present invention is that the referenced patent assumes that the correlation explicitly exists in the form of integrity constraints (e.g., $C_1<C_2$, where $C_1$ and $C_2$ are column names). However, the present invention is not limited to explicit correlations between columns, as described herein. Another difference is that in the referenced patent, the columns are of the same table. As described herein, the present invention is operable in such a scenario, however, it is not limited to discovery and use of correlated columns from the same table.

Unfortunately, in many real-world situations, it is not possible to know a priori the exact correlation that will exist between values in two columns. For example, it may happen that all sales managers in a company are female, even though there is no rule governing the gender of sales managers. In this situation, there could be a strong correlation between the values of a column that indicates job title, and values in a column that indicates gender. It would be desirable to enjoy the benefits of partition pruning when a correlation exists, even though it is not possible to dictate the correlation a priori.

Based on the foregoing, it is clearly desirable to provide a mechanism for partition pruning that overcomes the foregoing limitations regarding applicability. Further, partition pruning is just one context in which database operations may be made more efficient through the detection of correlations between values in different columns. For example, indices can be picked on a first column if there is a predicate on a second column, which is correlated to the first column, in a query definition. Thus, there is a more specific need for a mechanism to discover and exploit correlations between columns of tables, to enhance the performance of some query executions.

SUMMARY OF THE INVENTION

Methods are provided for automatically discovering and using correlated columns from one or more tables.

According to one embodiment, a set of significantly correlated columns is identified by identifying a set of correlated columns and determining the significance of the correlation between the correlated columns. A correlation table is then constructed that includes records representing distinct combinations of values corresponding to the correlated columns.

In various embodiments, methods are described for identifying the significant set of correlated columns by identifying tables that have a potential for correlation based on one or more factors that may include (1) the number of records associated with the tables, (2) tables that have a primary key-foreign key relationship, and (3) tables that are frequently joined in user queries. In one embodiment, a correlated column is identified by identifying a column that is the subject of an access structure, such as an index, a partitioning key, or a hash function.

According to one embodiment in which the correlated columns are from more than one table, the significance of the correlation between the correlated columns is determined by a ratio of (1) the number of distinct combinations of values for the correlated columns from at least a portion of the different tables, over (2) the maximum possible number of distinct combination of values in the correlated columns from the same portion of the tables, i.e., the product of the individual number of distinct values for each correlated column, (3) equaling significantly less than one.

According to one embodiment, a correlation table is maintained such that upon changes to columns of the one or more tables, delete operations associated with the one or more tables are not propagated to the correlation table. Hence, deleting a row from a base table may not result in deletion of the corresponding row from the correlation table even if there are no other rows in the base table that have the same correlation.

According to one embodiment, the correlation table that is constructed from the correlation discovery process is used in partition pruning of a partitioned table involved in the correlation, in reference to a query execution plan.

Various implementations of the techniques described are embodied in methods, in computer-readable media, and in apparatus.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system are described for automatic discovery of column correlations in tables. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Column Correlation

Consider the query:
SELECT c.customer_name, sum(s.sale_amount)
FROM sales s, orders o, customer c
WHERE s.order_id=o.order_id
  AND c.customer_id=o.customer_id
  AND o.order_date BETWEEN '1998-01-01'AND '1998-03-31'
GROUP BY c.customer_name;

using the following table definitions:
SALES(sales_id, order_d, sales_amount, shipment_date, . . . );
ORDERS(order_id, customer_id, order_date, . . . );
CUSTOMER(customer_id, customer_name, . . . ).

Assume that the SALES table is partitioned on the column shipment_date.

From this query, it is apparent that there is a predicate on column order_date from the ORDERS table. Furthermore, what might not be apparent is that the column order_date from the ORDERS table is correlated to the column shipment_date, which is the partitioning key for the SALES table, via the common column order_id from both the SALES and ORDERS tables.

Correlation between columns, in this context, refers to a strong relationship between the values in one column and the corresponding values contained in another column. Knowing about the existence of a column correlation allows one to take advantage of the predicate on order_date by propagating it to shipment_date, and thus perform partition pruning on the SALES table to reduce the number of records processed during query execution. Hence, techniques for automatic discovery of column correlations in tables are described herein. The techniques are not limited to application and use in partition pruning operations. Rather, discovery of a strong correlation between corresponding values in different columns is useful in a variety of contexts.

Figure 1:
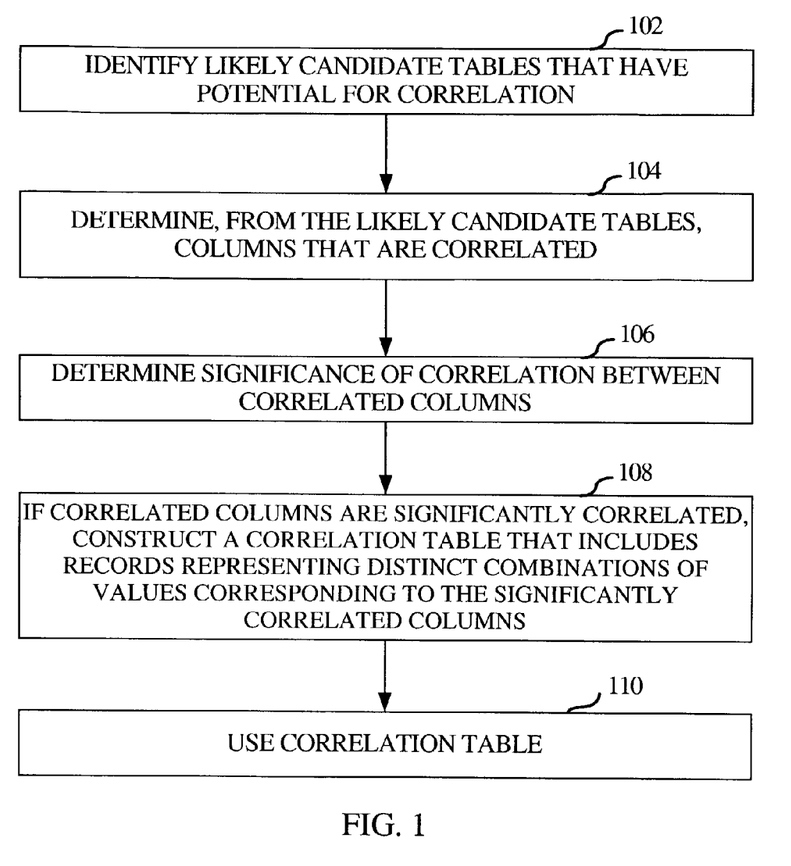
FIG. 1 is a block diagram generally illustrating a process for automatically discovering correlations between data columns in one or more tables, according to an embodiment of the invention.

FIG. 1 is a block diagram generally illustrating a process for automatically discovering correlations between data columns in one or more tables, according to an embodiment of the invention.

It is possible to search for correlations between columns by testing every column in every table against every column in every table. However, the computational resources required for such an exhaustive search for correlations is prohibitive. Consequently, in one embodiment, the test for correlation is performed only after filtering the candidate tables to those tables that are (1) most likely to have highly correlated columns and/or (2) most likely to result in significant improvement in performance if a correlation is found. Thus, at step 102, tables that have a relatively higher potential for correlation are identified. These tables shall be referred to herein as "likely candidate tables".

At step 104, it is determined which columns, if any, from the likely candidate tables, are correlated. The columns thus identified are referred to herein as the "correlated columns". For any given correlation, the correlated columns can come from the same table, or may belong to different tables.

At step 106, the significance of the correlation between correlated columns that are identified in step 104 is determined. In this context, the significance of a correlation refers to the degree of the correlation. Thus, if the degree of correlation between the values in two columns is relatively high, then that correlation is considered to be "significant". Correlated columns that have significant correlations are referred to herein as "significantly correlated columns".

At step 108, a correlation table is constructed that includes records representing distinct combinations of values corresponding to the significantly correlated columns. Finally, at step 110, according to one embodiment, the correlation table is used, typically to enhance the performance of a query execution process. Each of these steps is described in detail below.

Identification of tables with potential for correlation

At step 102, likely candidate tables are identified. In one embodiment, likely candidate tables are identified based on the number of records contained therein. The number of records in a given table can be approximated by using statistics gathered for the table by issuing a simple SQL query to determine the cardinality of the table.

The term cardinality refers to the number of cardinal, or basic, items in a set. For example, for a table such as a database table, the number of rows (records) is used to define the cardinality of the table (table cardinality). Furthermore, relationship cardinalities, which refer to the number of entity instances involved in the relationships, may be used. For example, two entities (e.g., columns) may have a one-to-one, one-to-many, or many-to-many relationship.

The benefits provided by using the correlation discovery and use techniques described herein are typically greater when used with larger tables because, in general, the scanning and processing of more records are avoided in larger tables. Furthermore, the techniques require a certain amount of computational overhead, which should be outweighed by the benefits gained from use of the process.

In one embodiment, likely candidate tables are identified based on a primary key-foreign key relationship between the tables, whereby one table contains references to rows stored in the other table. For example, values in the column order_id of the SALES table refer to records (rows) in the ORDERS table which have the same value in the order_id column. One method of discovering such a relationship is to review query join conditions, which often include predicates between a primary key from one table and a foreign key from another table. In addition, a user can also declare such relationships by defining referential integrity constraints, which are typically metadata declarations that enforce a dependency relationship between two tables through one or more fields.

In one embodiment, likely candidate tables are identified based on workload information. For example, tables that are frequently joined in user queries indicate a potential for correlation.

The column correlations that are identified may be associated with multiple columns from a single table or from multiple tables. That is, a correlation may be discovered (1) between two columns, each from a different table; or (2) between two columns from the same table; or (3) between more than two columns from one or more tables.

The correlation between columns from multiple tables need not be direct, that is, the columns can be correlated through one or more other tables (i.e., transitive correlation). For example, Column A from Table A may be correlated with Column from Table B, and Column from Table may be correlated with Column C from Table C. Thus, Column A from Table A can be discovered to be correlated with Column C from Table C. Furthermore, correlated columns from multiple tables can be correlated with correlated columns from different multiple tables. For example, a first correlation may be discovered between two columns, each from a different table; a second correlation may be discovered between two different columns, each from a different table that is not associated with the first correlation; and one or more of the correlated columns from the first correlation may be discovered to be correlated with one or more of the columns from the second correlation.

The foregoing embodiments are only some of the implementations available for identifying tables that have potential for correlation between constituent columns. Those skilled in the art may conceive of other methods, while remaining within the scope of the invention.

Identification of Correlated Columns

Once tables that have a potential for correlation are identified, at step 104 columns that are correlated are identified from the identified tables. That is, the specific columns that are correlated are identified. The columns can be constituent to a single data table or multiple tables.

According to one embodiment, a "brute force" method is used to identify correlated columns. According to the brute force method, each column is compared to every other column to determine whether any of the columns are correlated. For example, each column of table SALES is compared to each column of table ORDERS to determine that columns order_date and shipment_date are correlated via common orders identified by order_id.

In general, scenarios in which benefits provided by the creation of a correlation table outweigh the associated overhead include, but are not limited to, the following:

(1) correlated columns are from the same table $T_1$, or correlated columns are from tables $T_{1\ and\ T2}$, which can be joined either directly or indirectly;

(2) column $C_2$ of table $T_2$ (i.e., $T_2.C_2$) is indexed, is used as a partitioning column of $T_2$, or is used to build any other access structure for $T_2$;

(3) column $C_1$ of table $T_1$ (i.e., $T_1.C_1$) and $T_2.C_2$ are correlated; and (4) the number of distinct values for $(T_1.C_1, T_2.C_2)$ is not significantly large.

In one embodiment, identification of correlated columns includes identifying a column based on the number of distinct values for the particular column. Further in the correlation discovery operation, a correlation table is generated (as described below) that includes records representing distinct combinations of values corresponding to the correlated columns. Thus, identifying a correlated column that has a relatively small number of distinct values helps to minimize the size of the correlation table.

In one embodiment, identification of correlated columns includes identification of columns that are the subject of an access structure. With the presence of an access structure, benefits are provided by the additional predicate generated based on the correlation if the predicate is associated with a column that is the subject of an access structure.

In one embodiment, the access structure that is utilized to help identify correlated columns is implemented as an index.

In another embodiment, the access structure that is utilized to help identify correlated columns is based on partitioning information. As mentioned, table partitioning on a particular column is typically used to provide an access structure via the particular column, i.e., to provide quicker access based on a range of values in the column of interest.

In another embodiment, the access structure that is utilized to help identify correlated columns is based on a hash function. Using a hash function on a particular column is used to distribute the column values equally across hash tables and is typically used to provide an access structure, and thus quicker access via a column of interest.

Determination of significance of column correlation

Once correlated columns are identified, at step 106 the significance of the correlation is determined to identify a set of significantly correlated columns. In one embodiment, the significance of a correlation is determined as follows.

---

Let,
N = SELECT count (distinct $C_1$) * count (distinct $C_2$)
  FROM $T_1$ sample(1%), $T_2$ sample(1%)
  WHERE $T_1.K_1 = T_2.K_2$; and
n = SELECT count (distinct $C_1,C_2$)
  FROM $T_1$ sample(1%), $T_2$ sample(1%)
  WHERE $T_1.K_1 = T_2.K_2$.

---

N represents the theoretical, or maximum possible, number of distinct combination of values in the correlated columns $C_1$ and $C_2$ produced by a join of a sample of correlated table $T_1$ and a similar sample of correlated table $T_2$. The maximum is the product of the individual number of distinct values for each correlated column. Samples of the tables (e.g., a 1% sample of the records), instead of the complete tables, are used in order to minimize the computational overhead associated with the table join, since this join is for analytical purposes and not in direct response to a user query.

n represents the actual number of distinct combinations of values from correlated columns $C_1$ and $C_2$, produced by a conditional join ($T_1.K_1=T_2.K_2$) of a sample of correlated table $T_2$ and the same sample of correlated table $T_1$. For example, the join condition can be determined using either (1) primary key-foreign key relationship where $K_2$, of table $T_2$, may be a foreign key referring to a primary key $K_2$ of table $T_2$; or (2) frequently occurring joins from query workload information.

Next, if the following condition is met (e.g., returns "true"), then the correlation between columns $C_1$ and $C_2$ is considered significant.

$$n/N<<1.0.$$

A relationship between n and N that is significantly less than one is considered a significant correlation because it indicates that the number of distinct combinations of values for the correlated columns is significantly less than the total number of rows produced by a join of the tables. That is, the columns are strongly correlated, evidenced by the existence of repetitious value combinations with respect to the columns.

Furthermore, in one embodiment, the number of distinct combinations of values for the correlated columns is compared to a threshold value to determine whether it is computationally efficient to complete the process. That is, since a correlation table is generated (as described below), ensuring that the correlated columns have a relatively small number of distinct value combinations helps to minimize the size of the correlation table. Therefore, the cost of creating the correlation table is outweighed by the benefits related thereto.

In one implementation, the number of distinct value combinations is determined, by which the size of the data (e.g., logically, a data table) comprising the records representing the value combinations can be derived by estimating the size of the columns stored in the table. For example, one formula for estimating the size of the correlation table T is:

$$\text{size\_of\_table}(T)=n*(\text{size\_of\_column}(C_1)+\text{size\_of\_column}(C_2));$$

assuming $C_1$ and $C_2$ are the only columns stored in each record of the correlation table. A more generalized formula is as follows:

$$\text{size\_of\_table}(T)=n*(\Sigma_{i=1}^{\#of\ col}\ (\text{size\_of\_column}(C_i)).$$

The preceding formula computes the size of a correlation table (T) as the number of rows (n) multiplied by the size of a row, where the size of a row is the sum of the size of its columns ($C_i$). The variable i represents one column of the table and the summation is from the first column (1) to the last column (# of col.).

Thus, as depicted in the following relationship, if size_of_table(T)< size_threshold (for example without limitation, ten megabytes of data), then the benefits of the process are considered to outweigh the costs, and the process proceeds. The relationship is represented as follows:

$$\text{size\_of\_table}\ (T)<\text{size\_threshold}\ (e.g.,\ 10\ \text{Mb}).$$

Correlation Table Instruction

Once it is determined that the correlated columns are significantly correlated, at step 108 a correlation table is constructed for the significantly correlated columns. The correlation table includes records representing the distinct combinations of corresponding values contained in the columns that were found to be significantly correlated in step 106.

For example, the following generic query can be used to construct a correlation table:

```
SELECT distinct (C₁, C₂)
FROM T₁, T₂
WHERE T₁.K₁ = T₂.K₂.
```

For example, assume that n/N<<1 and size_threshold<10 Mb, where
n=SELECT count (distinct o.order_date, s.shipment_date)
  FROM orders sample (1%) o,
    sales sample (1%) s
  WHERE o.orders_id=s.orders_id; and
N=SELECT count (distinct o.order_date)* count(distinct s.shipment_date)
  FROM orders sample (1%) o,
    sales sample (1%) s
  WHERE o.orders_id=s.orders_id.
Thus, a correlation table is created as:
SELECT distinct o.order_date, s.shipment_date
FROM orders o, sales s
WHERE o.order_id=s.order_id.
Another generic query that can be used to construct the correlation table utilizes a GROUP BY clause, as follows:
  SELECT o.order_date, s.shipment_date, count(*)
  FROM sales s, orders o
  WHERE o.order_id=s.order_id
  GROUP BY o.order_date, s.shipment_date.

Note that the foregoing queries are merely examples of ways to construct an appropriate correlation table, but that the invention is not limited to these queries. Note that count(*) is stored so that the correlation table can be incrementally maintained, as described below.

In instances in which the correlation between columns of different tables is through a third table (such as table T1 correlated to table T3 via table T2), table T1 is joined to table T2 and table T2 is joined to table T3. Thus, there is not explicit join of tables T1 and T3.

Process for Discovering Correlations Between Columns in Tables

Figure 2:
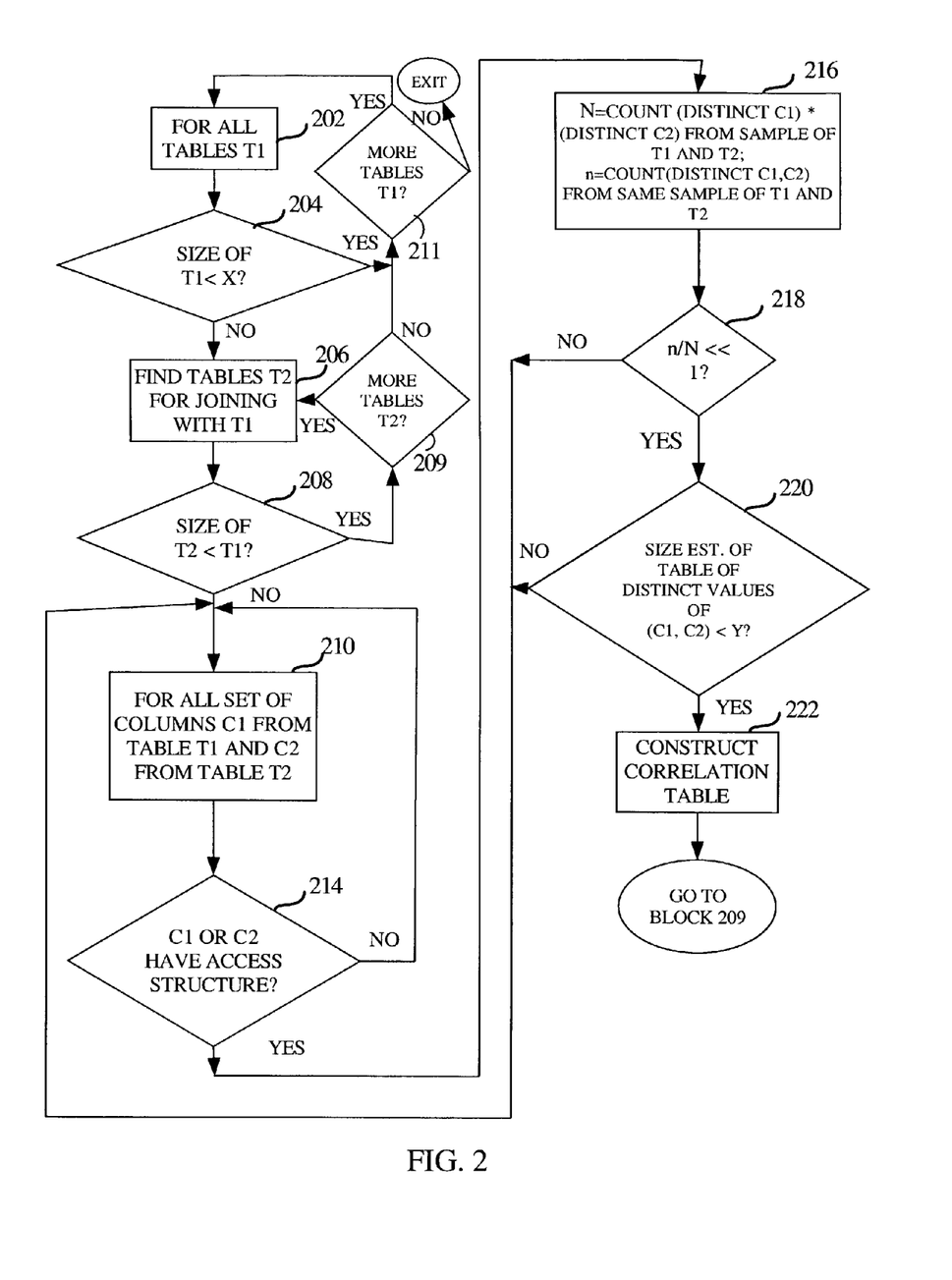
FIG. 2 is a flowchart illustrating a process for discovering correlations between columns in one or more tables, according to an embodiment of the invention.

FIG. 2 is a flowchart illustrating a process for discovering correlations between columns in one or more tables, according to an embodiment of the invention. FIG. 2 represents an implementation of, and is a non-limiting example of, the broader concepts described in reference to FIG. 1.

The process begins at block 202, where for all tables $T_1$ from a set of tables, it is determined whether the size of $T_1$ is less than a threshold value X, at block 204. Block 204 serves as a threshold determination as to whether to continue processing the current table $T_1$, based on its size, to ensure that the benefits of the process outweigh the costs. Thus, if a positive determination is made at block 204, the table is too small to provide a significant level of benefits, and the process proceeds to block 211 to determine the next table T1 from the set of tables. If a negative determination is made at block 204, the process continues to block 206 where all tables $T_2$ (from the set of tables) that have a potential for correlation with table $T_1$, are found. These can be tables related by primary key-foreign key relationship on some columns or tables frequently occurring as joins in database application workload.

At block 208, the size of table T2 is compared to the size of table T1. This serves two purposes. First, it ensures that the size of T2 is at least X. Second, it ensures that we consider a pair of tables only once. Thus, if a positive determination is made at block 208, the process proceeds to block 209 to determine whether there are more tables $T_2$. If the determination at block 209 is positive, proceed to block 206 to find the next table $T_2$ for joining with table $T_1$. If the determination is negative, proceed to block 211 to determine whether there are more tables $T_1$ from the set of tables. If a negative determination is made at block 208, then two likely candidate tables have been found, and the process continues to block 210.

Block 210 illustrates that all columns $C_1$ from table $T_1$ are considered in combination with all columns $C_2$ from table $T_2$. At block 214, it is determined whether columns $C_1$ or $C_2$ have an access structure. As previously described, examples of an access structure are an index, a hash table, or a partitioning key. Regardless of the type of access structure used in block 214, if either $C_1$ or $C_2$ has an access structure, then processing continues to block 216. If neither column has an access structure, then processing returns to block 210 to consider the next column $C_1$ that may be correlated with another column $C_2$. According to this embodiment, a pair of columns with no access structure is ignored because even if a correlation exists, it would not help to improve query performance.

Block 216 depicts the computation of N and n, as described above in reference to step 106 of FIG. 1, based on samples of table $T_{1\ and\ T2}$.

At decision block 218, it is determined whether n/N<<1. If a positive determination is made at block 218, then the process continues to block 220. If a negative determination is made at block 218, the significance of the column correlation does not outweigh the cost to construct and maintain the correlation table. Hence, processing returns to block 210 to consider the next column $C_1$ that may be correlated with another column $C_2$.

At decision block 220, it is determined whether the estimated size of the correlation table is less than the size threshold Y. Block 220 is an effort to ensure that the size of the final correlation table (i.e., a join of tables $T_{1\ and\ T2}$ on columns $C_1$ and $C_2$, with duplicate records eliminated) is such that the benefits of the process outweigh the costs of creating and maintaining the correlation table. This determination can easily and efficiently be made using statistics that are typically kept for tables. If a positive determination is made at block 220, then the process continues to block 222. If a negative determination is made at block 220, the cost to construct and maintain the correlation table is too high. Hence, processing returns to block 210 to consider the next column $C_1$ that may be correlated with another column $C_2$.

If both conditions are met at blocks 218 and 220, that is, n/N<<1 and the size of correlation table T<Y (size threshold), then the process continues to block 222, where a correlation table is constructed. If both conditions are not met, the process returns to block 210 to consider the next column $C_1$ of table $T_1$. Note that after all combinations of columns $C_1$ and $C_2$ from tables $T_1$ and $T_2$, respectively, have been considered, the process continues to block 206 to consider the next table $T_2$. Furthermore, after all tables $T_2$ are considered in combination with the current table $T_1$, the process continues to block 202 to consider the next table $T_1$. Note also that blocks 202–208 of FIG. 2 generally map to block 102 of FIG. 1; blocks 210–214 generally map to block 104; blocks 216–220 generally map to block 106, and block 222 maps to block 108.

Maintenance of Correlation Table

Once a correlation table is constructed, it needs to be maintained as the underlying "base" tables (i.e., tables $T_1$ and $T_2$) change. Maintenance of the correlation table can be through implementation of the same techniques that are used for maintaining materialized views, described in detail in U.S. Pat. No. 6,205,451 entitled "Method and Apparatus for Incremental Refresh of Summary Tables in a Database System", U.S. Pat. No. 6,125,360 entitled "Incremental Maintenance of Materialized Views Containing One-To-N Lossless Joins", and U.S. Pat. No. 6,134,543 entitled "Incremental Maintenance of Materialized Views Containing One-To-One Lossless Joins", all of which are incorporated by reference herein in their entirety for all purposes.

When using the techniques described in the foregoing patents, the correlation table is consistently maintained up-to-date when records are inserted or deleted from the base tables. However, according to one embodiment of the present invention, the same techniques are used, but for deferring (or foregoing) the processing of delete operations. Deleting a row from a base table may not result in deletion of the corresponding row from the correlation table if there are other rows in the base table that have the same correlation.

Processing delete operations for maintaining correlation tables requires significant computational overhead. If delete operations are not propagated to the correlation table, it may contain a super-set of the actual set of correlations. Hence, the query optimization routines, such as partition pruning, may not be precise. Nevertheless, the routine will still produce correct results with improved performance as compared to not using the correlation table. Thus, there is a tradeoff between correlation table maintenance and the query execution performance when utilizing the techniques described herein. In this embodiment, only insert operations on the base tables are maintained and propagated to the correlation table. Insert operations, in this context, include the insert portion of an update operation (update operations are considered as a delete operation followed by an insert operation).

Discovery and Use of Correlation Table for Partition Pruning

Some database management systems include an optimizer program for generating a query execution plan that optimizes the computational resources of the database management system. Often, a goal of the optimizer program is to save computational costs by reducing the number of disk block reads and the CPU time required to respectively access and process data associated with a query. Since using the correlation table involves additional overhead and extra work (from accessing it from disk), the optimizer program will weigh the benefits of using the table against its overhead and will decide to use the table only if the benefit is higher than the cost.

As described in the Background section, partition pruning can dramatically improve the performance of a query execution by avoiding the scanning and processing of data in the pruned partitions. However, in some instances prior techniques are unable to perform partition pruning on a partitioned table, for example, when the query does not include a predicate on the column on which the partitioned table is partitioned. Knowledge of the existence of correlation between columns of one or multiple tables allows a DBMS to take advantage of a predicate on a non-partitioning column of a table by propagating the predicate to a partitioning column and performing partition pruning accordingly, based on the predicate and the partitioning information. Propagation of the predicate from one column to a correlated column is implemented through use of the techniques described herein and the associated correlation table, whereby the correlation table is used to determine which partitions of a partitioned table to exclude from a query execution plan, which thereby improves the performance of the query execution.

Consider the following example query:

```
SELECT c.customer_name, sum(s.sale_amount)
FROM sales s, orders o, customer c
WHERE s.order_id = o.order_id
   AND c.customer_id = o.customer_id
   AND o.order_date BETWEEN '1998-01-01' AND '1998-03-31'
GROUP BY c.customer_name
``` where the SALES table is range-partitioned on column shipment_date, and there is a primary key-foreign key relationship from SALES table to ORDERS table on the order_id join key.

In applying the techniques described herein to the above query, a program could determine that tables ORDERS and SALES have a potential for correlation, based on, for example, the fact that they have a primary key-foreign key relationship. Specifically, each table includes an occurrence of a common key (or column), i.e., order_id. The potential for correlation between the tables could be further based on the fact that their relative sizes are sufficient to meet the threshold determinations depicted in FIG. 2 (e.g., blocks 204 and 208).

Next, the columns within tables ORDERS and SALES are analyzed to determine whether there are columns within the tables that are correlated. For example, it could be determined that the column shipment_date is a column from table SALES that is correlated, based on the fact that SALES is partitioned on shipment_date. In this example, a correlation between shipment_date and order_date is sought, so that the predicate on order_date from table ORDERS can be propagated to the partitioning key shipment_date from table SALES.

Tables ORDERS and SALES are analyzed to determine the significance of the correlation between columns shipment_date and order_date. Samples of data from the tables are joined. From that table join, the maximum possible combinations of shipment_date and order_date, N, is determined. From the same join, the number of distinct combinations of values, n, from columns shipment_date and order_date is determined. The ratio of n/N is computed and used to determine the significance of the correlation. For example, the correlation is considered significant if the ratio is considerably less than one. In addition, it is determined whether n is less than a threshold size, to ensure that the correlation table is kept to a reasonable size. If both of these conditions are true, the correlation between the columns is considered significant and the benefits of creating a correlation table from the tables is considered to outweigh the additional computational overhead associated with processing the correlation table. Hence, a correlation table is constructed from a join of tables SALES and ORDERS for the common orders (i.e., the records in which the order_id's are the same), and the correlation table includes the distinct combinations of values for columns shipment_date and order_date.

Since there is now a table representing orders that have a distinct order_date and shipment_date combination, the orders that have an order_date between '1998-01-01'and '1998-03-31', pursuant to the original query predicate, are identified. From these records, it can be determined which shipment dates correspond to the identified order dates meeting the criteria of the predicate, and therefore, which partitions from table SALES should be accessed to compute the original query. In other words, the table partitions that do not need to be accessed to compute the query, are pruned from the query execution plan, thereby avoiding numerous disk reads and unnecessary processing of associated data. The optimizer will add the following predicate to the original query:

s.shipment_date=ANY(SELECT shipment_date from sales_orders_C WHERE o.order_date between '1998-01-01' AND '1998-03-31';

where sales_orders_C is the correlation table between column shipment_date of table sales and column order_date of table orders.

In general, if a correlation table is built for the pair ($T_1.C_1$, $T_2.C_2$), then the following query:
  SELECT *
  FROM $T_1$, $T_2$, . . .
  WHERE join($T_1$, $T_2$) [using the join predicate used to build the correlation table]
    AND pred($T_1.C_1$) [this represents any predicate on $T_1.C_1$]
can be transformed to:
  SELECT *
  FROM $T_1$, $T_2$, . . .
  WHERE join($T_1$, $T_2$) [using the join predicate used to build the correlation table]
    AND pred($T_1.C_1$) [this represents any predicate on $T_1.C_1$]
    AND pred($T_2.C_2$) [predicate generated from the correlation table and the predicate on $T_1.C_i$].

The new predicate, pred($T_2.C_2$) is of the form:

$T_2.C_2$=ANY(SELECT $T_2.C_2$ FROM T WHERE pred ($T_1.C_1$)).

The final predicate on $T_2.C_2$ is particularly useful if it is used to drive a fast access on table $T_2$, such as in the case where $C_2$ is the subject of an access structure for $T_2$.

Hardware Overview

Figure 3:
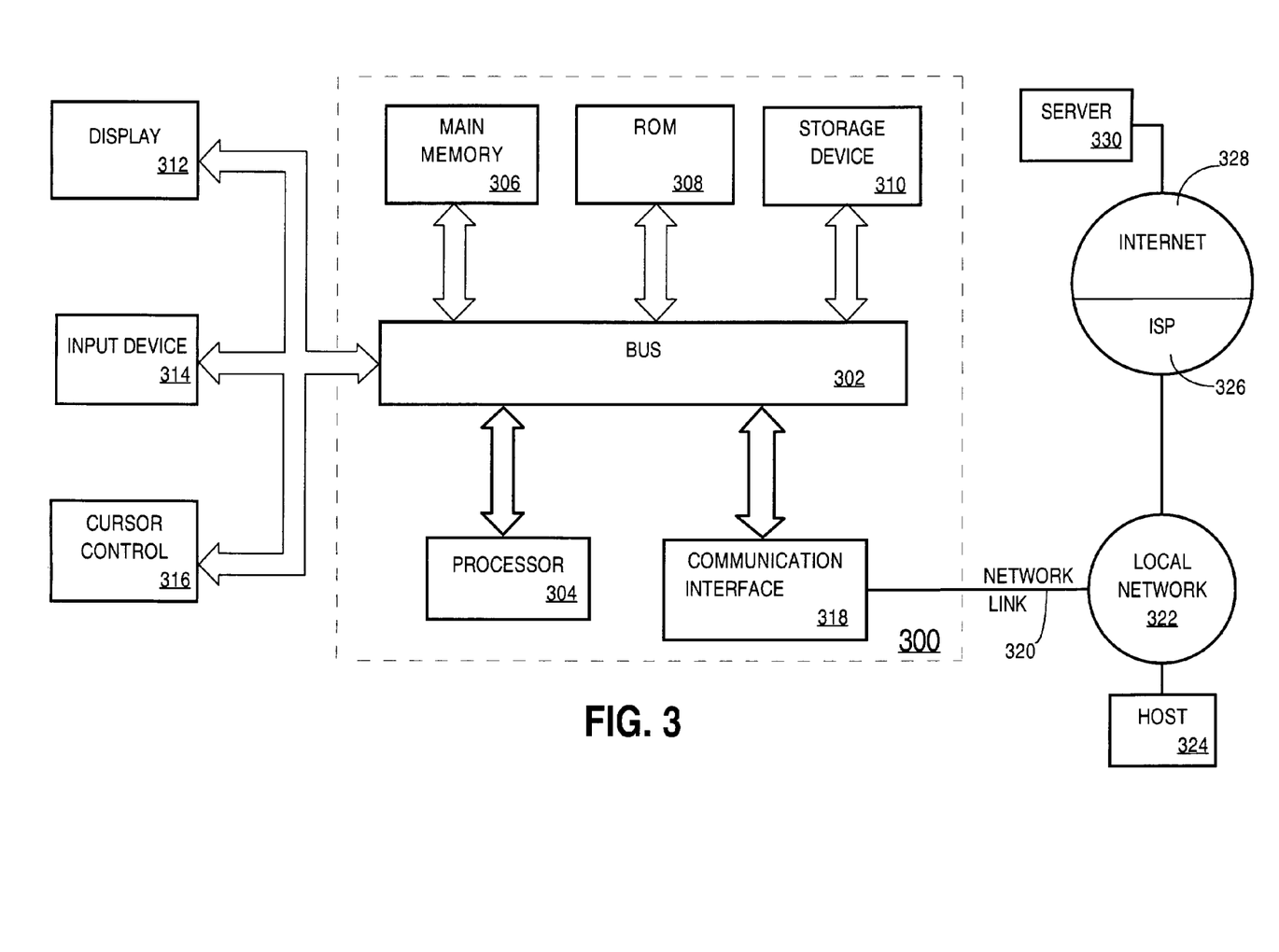
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, references have been made to the SQL database query language and examples of queries using SQL have been utilized throughout to aid in describing the invention. However, the techniques described herein are not limited to any database query language. For another example, an example use of the techniques is described in reference to table partition pruning. However, the techniques described herein are not limited to use for partition pruning, but may be used in other implementations, such as for index access path processing, whereby indices on a first column can be used if there is a predicate on a second column, which is correlated to the first column, in a query definition. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer implemented method for discovering correlations between columns in one or more tables, the method comprising:
    identifying a set of significantly correlated columns from one or more tables, wherein the step of identifying the set of significantly correlated columns comprises identifying a set of correlated columns; determining the significance of correlation between the correlated columns in the set of correlated columns; and creating a correlation table that includes records representing distinct combinations of values corresponding to the correlated columns in the set of significantly correlated columns.

2. The method of claim 1 wherein the step of identifying a set of correlated columns identifies the correlated columns from a single table.

3. The method of claim 1 wherein the step of identifying a set of correlated columns identifies the correlated columns from more than one table.

4. The method of claim 3 wherein the step of identifying a set of significantly correlated columns comprises:
    identifying likely candidate tables based on the number of records associated with the tables.

5. The method of claim 3 wherein the step of identifying a set of significantly correlated columns comprises:
    identifying likely candidate tables by identifying tables that have a primary key-foreign key relationship therebetween.

6. The method of claim 3 wherein the step of identifying a set of significantly correlated columns comprises:
    identifying likely candidate tables by identifying tables that are frequently joined in user queries.

7. The method of claim 1 wherein the step of identifying a set of correlated columns identifies, through a first table, the correlated columns from a second table and a third table that is different than the second table, wherein the second and third tables are different than the first table.

8. The method of claim 1 wherein the step of identifying a set of correlated columns comprises:
    identifying a column that is the subject of an access structure.

9. The method of claim 8 wherein the step of identifying a column that is the subject of an access structure includes identifying a column that is the subject of an index.

10. The method of claim 8 the step of identifying a column that is the subject of an access structure includes identifying a column associated with a partitioning key.

11. The method of claim 8 wherein the step of identifying a column that is the subject of an access structure includes identifying a column associated with a hash function.

12. The method of claim 1 wherein the step of identifying a set of correlated columns comprises:
    identifying a column of the set of correlated columns based on the number of distinct values for the column.

13. The method of claim 1 wherein each of the correlated columns from the set of correlated columns is identified from a different table, and wherein the step of determining the significance of correlation comprises:
    determining that a ratio of
        a number of distinct combinations of values in the correlated columns, from at least a portion of the different tables, over
        a product of the number of distinct values in each of the correlated columns, from the same portion of the different tables,
    is significantly less than one.

14. The method of claim 1 wherein the step of identifying a set of significantly correlated columns comprises:
    determining that the amount of storage required to store the distinct combinations of values of the correlated columns from the different tables is less than a threshold value.

15. The method of claim 1 comprising:
    using the correlation table to determine which partitions of a partitioned table, if any, to exclude from a query execution plan to improve the performance of the query execution.

16. The method of claim 1 comprising:
    maintaining the correlation table upon changes to the one or more tables, wherein delete operations associated with any of the one or more tables are not propagated to the correlation table.

17. The method of claim 1, wherein there is a predicate, in a query definition, on a second column that is significantly correlated to a first column, the method comprising:
    using an index on the first column to locate records satisfying the predicate on the second column.

18. A computer implemented method for discovering correlations between columns in tables, the method comprising:
    identifying likely candidate tables that have potential for correlation; determining, from the likely candidate tables, correlated columns; determining the significance of correlation between the correlated columns; if the correlated columns are significantly correlated, then constructing a correlation table that includes records representing distinct combinations of values corresponding to the correlated columns.

19. A computer implemented method for determining whether a correlation between two columns is significant, the method comprising:
    determining that a ratio of a number of distinct combinations of values in the correlated columns, from at least a portion of different tables, over a product of the number of distinct values in each of the correlated columns, from the same portion of the different tables, is significantly less than one.

20. A computer implemented method for partition pruning, the method comprising:

creating a correlation table having records representing distinct combinations of values corresponding to a first column and a second column, wherein the first column is a subject of a predicate in the query and the second column is a partitioning key for a table; based on the predicate on the first column, using the correlation table to prune partitions from the partitioned table.

21. A computer-readable medium carrying one or more sequences of instructions for discovering correlations between columns in one or more tables, wherein execution of the one or more sequences of instructions by one or more processors causes the one or more processors to perform the steps of:

identifying a set of significantly correlated columns from one or more tables, wherein the step of identifying the set of significantly correlated columns comprises identifying a set of correlated columns;

determining the significance of correlation between the correlated columns in the set of correlated columns; and creating a correlation table that includes records representing distinct combinations of values corresponding to the correlated columns in the set of significantly correlated columns.

22. The computer-readable medium of claim 21 wherein execution of the one or more sequences of instructions by one or more processors causes the one or more processors to perform the step of identifying a set of correlated columns by identifying the correlated columns from a single table.

23. The computer-readable medium of claim 21 wherein execution of the one or more sequences of instructions by one or more processors causes the one or more processors to perform the step of identifying a set of correlated columns by identifying the correlated columns from more than one table.

24. The computer-readable medium of claim 21 wherein execution of the one or more sequences of instructions by one or more processors causes the one or more processors to perform the step of identifying a set of correlated columns by identifying, through a first table, the correlated columns from a second table and a third table that is different than the second table, wherein the second and third tables are different than the first table.

25. The computer-readable medium of claim 23 wherein execution of the one or more sequences of instructions by one or more processors causes the one or more processors to perform the step of identifying a set of significantly correlated columns by performing the step of:

identifying likely candidate tables based on the number of records associated with the tables.

26. The computer-readable medium of claim 23 wherein execution of the one or more sequences of instructions by one or more processors causes the one or more processors to perform the step of identifying a set of significantly correlated columns by performing the step of:

identifying likely candidate tables by identifying tables that have a primary key-foreign key relationship therebetween.

27. The computer-readable medium of claim 23 wherein execution of the one or more sequences of instructions by one or more processors causes the one or more processors to perform the step of identifying a set of significantly correlated columns by performing the step of:

identifying likely candidate tables by identifying tables that are frequently joined in user queries.

28. The computer-readable medium of claim 21 wherein execution of the one or more sequences of instructions by one or more processors causes the one or more processors to perform the step of identifying a set of correlated columns by performing the step of:

identifying a column that is the subject of an access structure.

29. The computer-readable medium of claim 28 wherein execution of the one or more sequences of instructions by one or more processors causes the one or more processors to perform the step of identifying a column that is the subject of an access structure by performing the step of:

identifying a column that is the subject of an index.

30. The computer-readable medium of claim 28 wherein execution of the one or more sequences of instructions by one or more processors causes the one or more processors to perform the step of identifying a column that is the subject of an access structure by performing the step of:

identifying a column associated with a partitioning key.

31. The computer-readable medium of claim 28 wherein execution of the one or more sequences of instructions by one or more processors causes the one or more processors to perform the step of identifying a column that is the subject of an access structure by performing the step of:

identifying a column associated with a hash function.

32. The computer-readable medium of claim 21 wherein execution of the one or more sequences of instructions by one or more processors causes the one or more processors to perform the step of identifying a set of correlated columns by performing the step of:

identifying a column of the set of correlated columns based on the number of distinct values for the column.

33. The computer-readable medium of claim 21 wherein each of the correlated columns from the set of correlated columns is identified from a different table, and wherein execution of the one or more sequences of instructions by one or more processors causes the one or more processors to perform the step of determining the significance of correlation by performing the step of:

determining that a ratio of a number of distinct combinations of values in the correlated columns, from at least a portion of the different tables, over a product of the number of distinct values in each of the correlated columns, from the same portion of the different tables, is significantly less than one.

34. The computer-readable medium of claim 21 wherein execution of the one or more sequences of instructions by one or more processors causes the one or more processors to perform the step of identifying a set of significantly correlated columns by performing the step of:

determining that the amount of storage required to store the distinct combinations of values of the correlated columns from the different tables is less than a threshold value.

35. The computer-readable medium of claim 21 wherein execution of the one or more sequences of instructions by one or more processors causes the one or more processors to perform the step of:

using the correlation table to determine which partitions of a partitioned table, if any, to exclude from a query execution plan to improve the performance of the query execution.

36. The computer-readable medium of claim 21 wherein execution of the one or more sequences of instructions by one or more processors causes the one or more processors to perform the step of:
maintaining the correlation table upon changes to the one or more tables, wherein delete operations associated with any of the one or more tables are not propagated to the correlation table.

37. The computer-readable of claim 21, wherein there is a predicate, in a query definition, on a second column that is significantly correlated to a first column, and wherein execution of the one or more sequences of instructions by one or more processors causes the one or more processors to perform the step of:
using an index on the first column to locate records satisfying the predicate on the second column.

38. A computer-readable medium carrying one or more sequences of instructions for discovering correlations between columns in tables, wherein execution of the one or more sequences of instructions by one or more processors causes the one or more processors to perform the step of:
identifying likely candidate tables that have potential for correlation;
determining, from the likely candidate tables, correlated columns;
determining the significance of correlation between the correlated columns;
if the correlated columns are significantly correlated, then constructing a correlation table that includes records representing distinct combinations of values corresponding to the correlated columns.

39. A computer-readable medium carrying one or more sequences of instructions for determining whether a correlation between two columns is significant, wherein execution of the one or more sequences of instructions by one or more processors causes the one or more processors to perform the step of:
determining that a ratio of
a number of distinct combinations of values in the correlated columns, from at least a portion of the different tables, over
a product of the number of distinct values in each of the correlated columns, from the same portion of the different tables,
is significantly less than one.

40. A computer-readable medium carrying one or more sequences of instructions for partition pruning, wherein execution of the one or more sequences of instructions by one or more processors causes the one or more processors to perform the step of:
creating a correlation table having records representing distinct combinations of values corresponding to a first column and a second column, wherein the first column is a subject of a predicate in the query and the second column is a partitioning key for a table; and
based on the predicate on the first column, using the correlation table to prune partitions from the partitioned table.

41. A computer apparatus comprising:
a memory; and
one or more processors coupled to the memory and configured to execute one or more sequence of instructions for discovering correlations between columns in one or more tables, wherein execution of the one or more sequences of instructions by one or more processors causes the one or more processors to perform the steps of:
identifying a set of significantly correlated columns from one or more tables, wherein the step of identifying the set of significantly correlated columns comprises
identifying a set of correlated columns;
determining the significance of correlation between the correlated columns in the set of correlated columns; and
creating a correlation table that includes records representing distinct combinations of values corresponding to the correlated columns in the set of significantly correlated columns.

42. A computer apparatus comprising:
a memory; and
one or more processors coupled to the memory and configured to execute one or more sequence of instructions for partition pruning, wherein execution of the one or more sequences of instructions by one or more processors causes the one or more processors to perform the steps of:
creating a correlation table having records representing distinct combinations of values corresponding to a first column and a second column, wherein the first column is a subject of a predicate in the query and the second column is a partitioning key for a table; and
based on the predicate on the first column, using the correlation table to prune partitions from the table.

* * * * *